| | |
|---|---|
| 16a | DEEP-FISSURE SCORING CIRCUMFERENCE OF A CIRCLE ON A FLAT GLASS |
| 18a | CENTER TOP TAPPING TO PROPAGATE FRACTURE |
| 20a | APPLYING HEAT ALONG SAID FRACTURE FROM ABOVE TO FURTHER PROPAGATE SAID FRACTURE |
| 22a | APPLYING HEAT ALONG SAID SCORE FROM BELOW TO FURTHER PROPAGATE SAID FRACTURE BUT LEAVING A THIN SKIN REMAINING |
| 24a | APPLYING EDGE NICKS TO THE FLAT GLASS |
| 24a' | APPLYING SPOT HEAT TO EACH EDGE NICK UNTIL A VENT IS COMPLETED TO THE CIRCLE |
| 26a | BREAKOUT |
| 28a | LIGHT SEAMING OF UPPER AND LOWER EDGES OF CIRCLE |

United States Patent Office 3,795,572
Patented Mar. 5, 1974

3,795,572
METHOD OF CUTTING GLASS AND ARTICLE MADE THEREBY
Robert P. De Torre, Pittsburgh, Pa., assignor to PPG Industries, Inc., Pittsburgh, Pa.
Continuation-in-part of applications Ser. No. 57,574, July 23, 1970, and Ser. No. 68,735, Sept. 1, 1970, both now abandoned. This application May 26, 1972, Ser. No. 257,104
Int. Cl. C03b 33/00
U.S. Cl. 161—149
32 Claims

ABSTRACT OF THE DISCLOSURE

Pieces of glass are cut to desired size without the necessity of grinding to size and polishing. Edges of the piece are cut in accordance with a procedure involving the use of a blunt scoring wheel of larger-than-usual diameter and a greater-than-usual applied pressure, to produce a fissure 1.5 millimeters deep or more, followed by the application of a bending moment to sever the glass or of heat along the length of the score to cause the glass to become nearly severed. In the latter instance a thin glass layer remains that is easily severed. Light seaming of the tops and bottoms of the edges completes the preparation of those edges. In a further aspect, a curved deep fissure is produced by a blunt scoring wheel of larger-than-usual diameter under greater-than-usual pressure, in the same manner as above. However, a top center tap is used to propagate a fracture, leaving only a thin glass layer which is then severed. Light seaming completes the preparation of the curved edge.

CROSS-REFERENCE TO RELATED APPLICATIONS

This application is a continuation-in-part of U.S. application Ser. No. 57,574, filed July 23, 1970 and U.S. application Ser. No. 68,735, filed Sept. 1, 1970, which latter application is a continuation-in-part of said U.S. application Ser. No. 57,574, both now abandoned.

BACKGROUND OF THE INVENTION

(1) Field of the invention

This invention relates to a method for scoring or cutting glass using a large diameter cutting wheel, and in particular, for the manufacture of architectural panels, furniture tops and other relatively thick glass articles, for example, in excess of 10 millimeters (especially in the range of 18 to 36 millimeters or above), having dimensions such as 4 meters by 8 meters or circles and ovals from about 15 centimeters in diameter and up.

(2) Description of the prior art

In the manufacture of architectural-glass panels and furniture tops of the kind indicated above, it has hitherto been usual to obtain panels of the desired size by hand scoring and mechanical snapping of the edges of the glass to yield a piece somewhat greater in its dimensions than the final size desired, followed by the grinding of the edges of the piece to the desired size and the polishing of the ground edges. The grinding and polishing are time-consuming and costly operations, but they have hitherto been considered necessary particularly in cutting glass sheets of substantial thickness. The scoring and snapping hitherto done in the preparation of panels of this kind has invariably left an edge of such low quality that such grinding and polishing could not be avoided.

In the past, it has been more common for architectural panels to have a surface area somewhat smaller than that indicated above and to be made of glass about 5 to 14 millimeters thick. There has been increasing demand, however, for panels of larger surface area and, in view of the larger surface area, of greater strength (thickness), so as to withstand increased wind load.

It is important that architectural panels exhibit adequate edge strength. When tested in accordance with the conventional beam-loading test, the ground-and-polished edges of a 4-meter by 8-meter sheet, about 18 millimeters thick, produced in accordance with the prior art exhibit strength values such as about 4.6 to 4.9 kilograms per square centimeter. Panels exhibiting values substantially lower than about 4 kilograms per square centimeter are noticeably more susceptible to breakage.

Prior to the instant invention, it has not been customary, insofar as I am aware, to use a relatively blunt (over 140°) scoring wheel having a diameter as great as 12 millimeters. Ordinarily, scoring wheels have been used that are about 3 to 5 millimeters in diameter. Attempts to produce a deep fissure in thick glass using a cutting wheel having a relatively small diameter or a relatively sharp cutting angle have not been successful. It has not been usual to use a cutting angle as blunt as 160° on a 12-millimeter wheel, nor to produce a fissure by scoring the glass as deeply as is done in accordance with the instant invention.

The cutting of glass by the action of heat is known. In this connection, reference may be made to Campbell et al.; U.S. Pat. No. 1,720,883; Hitner, U.S. Pat. No. 1,777,644; Spinasse, U.S Pat. No. 1,973,546; Hafner, U.S. Pat. No. 3,453,097; and Chatelain et al., U.S. Pat. No. 3,474,944.

The Campbell et al. patent discloses, for example, the severing of glass in accordance with a method comprising "bringing a hot object or objects or elements, heated electrically or otherwise, into contact with or into close proximity of the glass." It discloses, moreover, that: "In order to quickly initiate the severing action, a nick or fault or other weakened portion may be formed by the apparatus at a point on the glass at the line of cleavage where the severing action is to start."

The Hitner patent discloses, for example, "an improved apparatus adapted to prevent the somewhat irregular line of fracture which has hitherto been characteristic of the severing of glass by the use of an electrically heated wire or ribbon." The Hitner patent uses an electrically heated wire for the non-contact severing of glass, but it teaches "providing means for giving a distribution of heat over a substantial area of glass on each side of the ribbon or wire," saying as to the cut or fracture produced that, "As a result, the line or fracture is smooth and regular, approximating in these particulars the line of fracture secured by scoring the glass with a diamond or wheel."

The Spinasse patent teaches, for example, having "a tubular portion of metal or other suitable refractory material adapted to present a heating surface in close contact with or in close proximity to the body of the drawing sheet near the region where the same is to be cut to remove the border." It teaches further: "It will be obvious, therefore, that as the sheet of glass is drawn past the heating element the border of the glass is heated in a path parallel to and near the edge of the sheet so that if the glass could be cut or checked by means of a cold checking tool beyond the heated path, shown by the broken line in FIG. 2, the border can be easily removed without fracturing the body of the sheet." The patent further teaches that the "temperature of the heating element can be varied according to the thickness of the glass or the speed at which it is drawn past the heater but as a rule a cherry-red heat yields good results for the average sheet at the average speed of drawing."

The Hafner patent discloses, for example, a method of cutting glass "wherein the glass sheet is moved continuously past a continuous laser beam which is focused upon the glass sheet. The laser and absorptive characteristics and parameters are selected so that the glass absorbs the laser energy and converts it into sufficient heat to enable separation of the sheet into pieces along the line swept by the laser beam."

The Catelain et al. patent discloses, for example, a method of cutting glass wherein scoring "produces a fissure which propagates deeply into the sheet and usually extends to the opposite face thereof." The reference also discloses that, "The heat is applied at a preselected number of points spaced just outside the second line, thus causing the band to break and drop away, leaving intact the first panel."

SUMMARY OF THE INVENTION

According to the present invention, grinding to size and edge polishing, in the preparation of pieces of glass are advantageously avoided by use of a cutting procedure that involves deep scoring under high pressure, most advantageously by using a relatively large, blunt scoring wheel, followed by the propagation, e.g., thermal or mechanical opening of a fracture at the deep score, under conditions that cause the deep-score fissure to propagate in a direction perpendicularly to the plane of the surfaces of the glass.

According to a first thermal opening embodiment of the present invention, the edges and/or the ends of a sheet of flat glass are removed by: imposing a deep-fissure score on a surface of said sheet from a first end to a second end of said sheet to a depth of at least about 1.5 millimeters, which for thick glass is at least about 6% of the thickness of said sheet by a scoring wheel having a diameter of about 12.7 millimeters and a cutting angle of about 160°; mechanically tapping one of said first end and said second end of said score from below to start the propagation of a fracture from said score; directing a heat source from above directly on said one end of said deep-fissure score; moving said heat source gradually from one end to the other end of said deep-fissure score to cause the sheet to become nearly severed by further propagating said fracture; directing a heat source from below said fracture along its entire length to further propagate said fracture; snapping a thin zone that remains beneath said fracture to release a piece of glass from said sheet; and light seaming the upper and lower portions of an edge of said piece so produced.

According to another thermal opening embodiment of the present invention, the trim is removed by: imposing a deep-fissure score on a surface of a sheet from a first end to a second end of said sheet to a depth of at least about 1.5 millimeters, which for thick glass is at least about 6% of the thickness of said sheet by a scoring wheel having a diameter of about 12.7 millimeters and a cutting angle of about 160°; mechanically tapping one of said first end and said second end of said score from below to start the propagation of a fracture from said score; directing a heat source from above directly on said one end of said deep-fissure score; moving said heat source gradually from said one end to the other end of said deep-fissure score to cause the sheet to become nearly severed by further propagating said fracture; directing a heat source from below said fracture along its entire length to further propagate said fracture; applying edge nicks to said sheet; applying spot heat to each edge nick until a vent is completed to said fracture; breaking out a piece of glass from said sheet; and light seaming the upper and lower portions of an edge of said piece so produced.

In another thermal opening embodiment, curved edges such as circles and ovals, are cut in a manner identical with the above embodiment, except that a top center tap is used to propagate a fracture around the curved deep fissure.

The deep-fissure score is imposed on a sheet of glass by a cutting wheel having a diameter of about 12 to 50 millimeters, and a cutting angle between about 150° and 165°.

In a further aspect, the invention provides a way of taking thinner edge trims from pieces of glass than are customarily taken by conventional methods involving hand scoring and mechanical snapping. This has obvious advantages, particularly in respect to minimizing wastage of glass.

In accordance with this invention, it is possible to remove a trim as little as one and one-half times the thickness of the piece of glass being cut. For best results it is inadvisable to remove a trim less than one and one-half times the thickness of the piece of glass, but this represents a considerable advance in the art of cutting glass, since it has hitherto been usual to insist upon taking a trim at least eight times the thickness of the glass. Therefore, it will now be possible to operate a preceding glass-producing operation so as to produce a ribbon or plate that has dimensions that are somewhat smaller than would have previously been required, with an obviously favorable effect upon the overall economy of the process. For example, prior to the instant invention, it was considered necessary to produce a float-glass ribbon 330 millimeters wide in order to obtain a finished piece 300 millimeters wide. In accordance with the instant invention, a ribbon of 330 millimeters in width will yield a finished piece 315 millimeters wide, or a finished piece of 300 millimeters in width could be produced with a float-glass ribbon only 315 millimeters wide. A smaller savings is obtained on the ends of the piece being finished.

With straight cuts that are within a central area of a piece of glass, propagation of a deep score by heat may be avoided. For example, when making a cut within the inner third of a piece of 19-millimeter thick glass, a bending moment may be applied about a deep score with a conventional cut-running apparatus to produce a cut edge that is suitable for most glazing installations. In this case, the propagation of the deep score into a fracture is accomplished by the bending moment.

In accordance with the present invention, it is now possible to snap off a trim from one side of a piece of glass and leave a smooth, perpendicular cut edge of usable quality, however great the length of the side. Prior methods for cutting heavy glass were limited (without grinding being used) to use with sides not more than one or two meters in length. In the present invention, there is no limitation as to the length of the piece of glass being cut except those limitations imposed by the considerations of handling and shipping the finished piece of glass.

DESCRIPTION OF THE DRAWINGS

A complete understanding of the invention may be obtained from the foregoing and following description thereof, taken together with the appended drawings which are not drawn to scale unless noted, in which.

DESCRIPTION OF THE PREFERRED EMBODIMENTS

Figure 1:
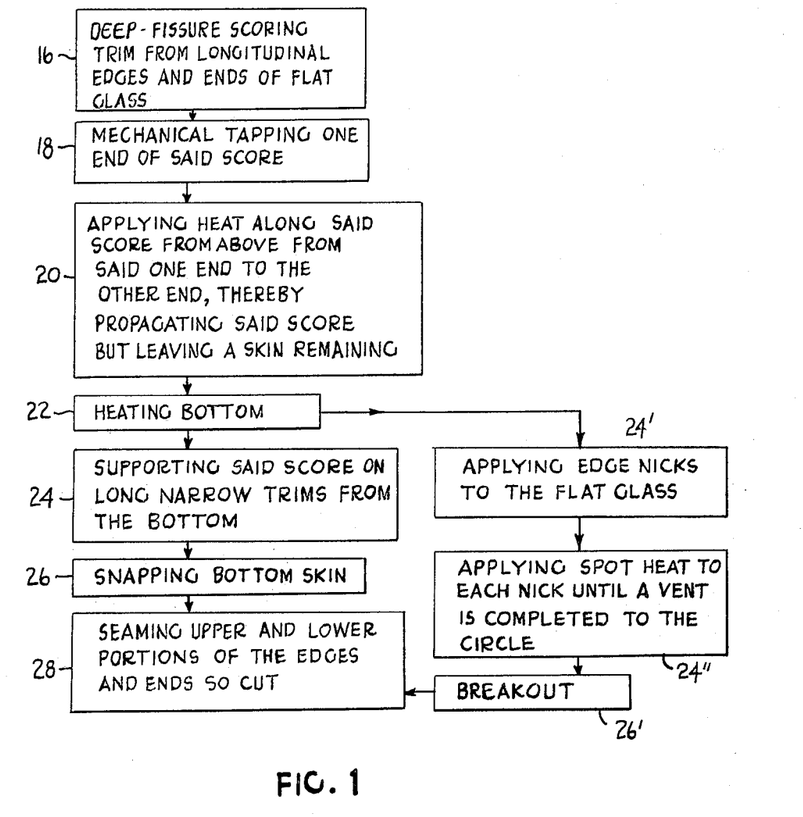
FIG. 1 is a flow diagram of a process showing all steps thereof including both essential and optional steps in accordance with the present invention.

Referring to FIG. 1, a flow diagram of a typical example of the process as performed in accordance with the present invention is shown. While this process is useful in the cutting of all flat glass, it has particular utility on thick pieces of glass, for example, a piece 18 millimeters thick or more (rarely in excess of 36 millimeters), 3 meters wide, and 7 meters long. This is because of the fact that prior methods were not capable of producing a high quality cut on such thick glass efficiently. A piece having the dimensions indicated above is sometimes referred to by the inventor as a "jumbo." A piece of glass of such dimensions may conveniently be made in accordance with conventional float-process technology. It is to be understood that in order to obtain glass of the thickness mentioned above, suitable measures are taken in the float process. All that is required for the production of the "jumbo" is that the float ribbon after adjustment to the desired thickness be cut transversely of its length at suitably spaced intervals by conventional means, such as at distances about 5 to 10 meters apart. The exact dimensions will depend upon the dimension requirements of the finished piece.

The deep-fissue scoring of block 16 in the flow diagram of FIG. 1 is such, in a piece of flat glass 18 millimeters thick, as to produce a fissure having a depth of at least 1.75 millimeters. Such a deep-fissure score is conveniently made by means of a scoring wheel of the kind depicted in FIG. 2.

Figure 2:
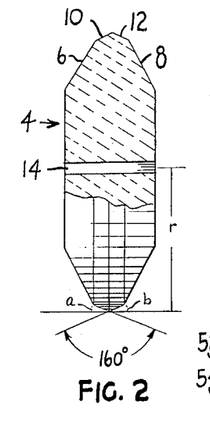
FIG. 2 is a vertical cross-sectional view of a typical cutting wheel used in the practice of the present invention.

Referring to FIG. 2, there is shown a cutting wheel 4 made of tungsten carbide or other suitable material of hardness of about 7 or more on Mohs' scale and having a radius r within the range of 6 to 25 millimeters, preferably within 9 to 16 millimeters. The base angle, i.e., the angle between the two sides 6 and 8, if extended, is about 120° and the angle between the sides 10 and 12 (the cutting angle) is between about 150° and about 165° with 160° providing optimum results. The wheel is provided with a central axle hole 14 having, as indicated, a diameter of about 2.4 millimeters. Hole 14 provides a means for rotatably mounting said wheel on a shaft that is passed through the axle hole 14. The wheel 4 is urged into contact with the glass to be cut at a force, for example, of about 60 kilograms, using a wheel having a radius of 6.3 millimeters. This can be done by means of a cutting instrument having a backup wheel positioned beneath the glass and adjustable means urging together the backup wheel and the cutting wheel 4 so as to permit the scoring pressure to be appropriately adjusted. The scores so produced correspond to the intended location of the edge of the finished piece. The operation of cutting the bulb edges and ends of the "jumbo" may be brought about by any suitable means, such as a vacuum-cup lifting device. To guide the cutting device mentioned above, a straight-edge member is secured to the glass as is conventional in prior-art scoring. If desired, a suitable oil or lubricant can be applied to the upper surface of the glass along the path of the intended scoring and cut.

Although a preferred embodiment of the present invention incorporates a cutting wheel or disc having a radius within the range of 6 to 25 millimeters, others means will become apparent to carry out the present invention. For example, one may wish to construct a member that comprises a continuous chain forming a curved outer periphery (constructed somewhat like a chain saw) as a cutting edge rather than a wheel. It would still be necessary to maintain both the blunt cutting angles and the high pressures described above. It is also necessary to maintain the effective radius of the continuous chain within the above-mentioned range. For example, the continuous chain could take the path of an oval, but the radius of the oval at the point of contact of the chain and the glass (effective radius) should be within the same range as the radius (or effective radius) of a cutting wheel.

It is important to note the importance of orienting the cutting wheel such that it is substantially perpendicular to the surface of the glass to be scored. The deep fissure generally extends in the same direction as the cutting wheel. Therefore, if the cutting wheel is not perpendicular to the glass surface, the resultant deep fissure will not be perpendicular. Referring to FIG. 2, angles a and b indicate the angles between the cutting wheel and the glass surface. With a cutting wheel having a cutting angle of 160°, both angle a and angle b should be maintained at 10°. If one of the angle is increased (and the other necessarily decreased), the resulting score will not be perpendicular. This is unacceptable for most uses.

Although the end-removal operation may be performed at an early stage in the finishing of the piece of glass involved, it is ordinarily desirable to wait until the width of the sheet has been cut to the desired dimension, before working upon the ends. It is relatively safe to postpone the length-reducing operation to the end of the plate-finishing operation, since the transverse (end) cuts are relatively short ones, i.e., ones that are usaully less likely to give difficulty than the cuts along the longitudinal edges of the plate.

I have discovered that a deep fissure in thick glass is more advantageous than a shallow fissure, since the glass sheet will be weaker directly beneath a deep fissure than beneath a shallow fissure.

Moreover, the depth of the fissure is directly related to the pressure applied to the cutting wheel. As pressure is increased, the depth of fissure also increases. However, for a wheel of any given diameter, there is a practical limit to the amount of pressure that can be applied. For example, a normal cutting wheel of about 6 millimeters in diameter with a blunt angle of about 160° has a maximum fissure depth of about 1 millimeter at a force of about 18 kilograms. If the force is increased, additional defects result in the edge surface without any increase in fissure depth. I have discovered that in order to increase fissure depth. It is necessary to increase the diameter of the scoring wheel. As the diameter of the scoring wheel is increased, it is possible to increase the force applied to the wheel and to increase the fissure depth without causing excessive edge defects on the edge surface of the piece of glass. For example, a cutting wheel having a radius of 9 millimeters, with a cutting angle of 160°, will produce a fissure depth of about 2.3 millimeters with a force of about 80 kilograms. If the force is increased, the fissure depth will not increase, and additional or excessive surface defects will result. With a 13-millimeter-radius cutting wheel, having a cutting angle of 160°, a 90-kilogram force will produce a 2.5 millimeter maximum fissure depth without excessive surface defects. With a 16-millimeter-radius cutting wheel, having a 160° cutting angle, a force of 105 kilograms will produce a maximum fissure depth of 3.1 millimeters without excessive surface defects. In each of these cases, increasing the applied force, beyond the stated maximums, creates additional or excessive surface defects without any increase in fissure depth. Compare these examples with a cutting wheel having a radius of 3 millimeters and a cutting angle of 160°. A force of 18 kilograms will produce a maximum fissure depth of only 1.0 millimeter.

The above results seem to indicate that the diameter of the cutting wheel and the pressure applied thereto should be increased indefinitely. It is to be noted, however, that as the diameter and the pressure are increased, the amount of seaming necessary to finish the edge will also increase.

Ordinarily, it is not practical to have to seam more than about 3 millimeters or perhaps, in extreme cases, 6 millimeters. Using a cutting wheel having a radius of 16 millimeters with a cutting angle of 160° at the force indicated above, it is necessary to seam about 3 millimeters from the edge. This is the maximum amount practical. It is possible to use 160° cutting wheels having a radius such as 25 millimeters at the above-mentioned force, but for most cases, this would necessitate excessive seaming.

The overriding consideration in all cases is, of course, the depth of the fissure produced, which must in all cases be of sufficient depth to cause the propagation of the cut downward, i.e., substantially perpendicular to the major surfaces of the piece of glass being cut.

Referring now to the block 18, of FIG. 1, there is indicated a step of mechanical tapping an end of the score. This is done with a hammer or mallet, gently, from beneath the glass on the face opposite the score in the vicinity of one end of the score. The purpose of this operation is merely to start or propagate the fracture to a considerable depth of the glass at one end of the score to diminish the dwell time of the thermal source to be used at the beginning of the immediately succeeding operation (block 20). The step of block 18 can be omitted entirely, provided that dwell time of the heating process is increased to start the propagation of the deep fissure. Mechanical tapping saves about 10–15 seconds dwell time in 18-millimeter glass at the beginning of the heating process described below.

Referring now to block 20, propagation of a fracture beneath the score is produced by applying heat to the score itself. This step of the process may comprise applying localized heat directly on an end of the score (for example, the one that has been tapped in accordance with the procedure of block 18) from above and progressively along the score to create a fracture that nearly extends to the opposite surface. This may be done with a small hand-held blowtorch or the like. Various kinds of hand-held torches that burn propane or other suitable gaseous fuel are readily available and are familiar to those skilled in the art; these may be used. Other alternatives will suggest themselves to persons of ordinary skill in the art, such as the use of a flameless, electrically-operated serpentine gas heater, producing an air flow of 35 cubic feet per hour at an outlet temperature of 1750° F. with a power utilization of 470 watts.

The rate of passage of the heating means with respect to the score along its length should depend, to some extent, upon the potency of the thermal source and the thickness of the glass. It will probably be substantially slower than the rate of passage of the scoring apparatus. Since the speed of scoring is not critical, it is usually high (about 25 centimeters per second). The heat source generally proceeds along the score at about 5–12 centimeters per second. The operator can tell whether the rate of the passage used is satisfactory; as the heat source is moved along, the advancing front of the area that has been thermally opened in accordance with this step of the invention can be seen to precede the location of the source by about 20 to 60 millimeters. It is to be understood that the thermal opening that is practiced in accordance with this step of the invention does not cause the edge to be severed from the glass instantaneously. In the case of glass 18 to 19 millimeters thick, about 1 to 2 millimeters of glass usually remains unsevered at the bottom of the fissure and resultant fracture propagation that has been opened by the application of the thermal energy in accordance with this step of the invention.

Figure 3:
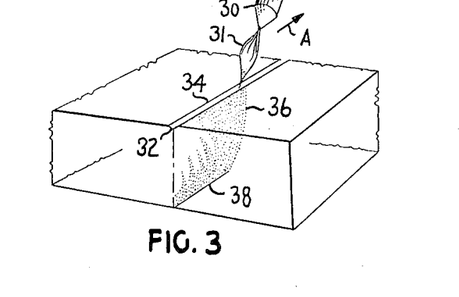
FIG. 3 is a perspective view of a jet heat source directing heat along a previously formed deep-fissure score line.

Referring to FIG. 3, there is shown a diagram of a small hand-held gas torch 30 with a flame 31 directed toward a first end 32 of a deep-fissure score 34. Arrow A indicates the direction of travel of the torch as it passes from the first end 32 to a second end (not shown) of the deep-fissure score. As the torch 30 is moved over the source or fissure from the first end 32 to the second end of the fissure, a deep fracture is propagated in a direction perpendicular to the glass surface leaving only a thin skin or zone 38 holding the trim to the remainder of the piece of flat glass. In the case of the use of a small hand-held gas torch, the flame preferably should be directed at an angle of 20° to 70° with respect to a major surface of the glass. It is to be understood that the width of the flame is wider than the width of the score and the glass surface adjacent the score is therefore directly heated by the flame.

Referring to block 22 of FIG. 1, it is desirable, when higher quality cuts are desired to pass a blowtorch or other heat source underneath the intended line of cut and along its entire length, taking for example, something like 7 to 15 seconds to traverse a length of 5 to 6 meters. This conditions the skin remaining to be broken at the base of the fracture to aid in obtaining a cut of even higher quality. When this step is used, it must follow either after or during the top heating of the score. If the effect of bottom heating dissipates before the top heating is conducted, there is no benefit obtained.

Referring now to block 24, pieces of flat glass that are longer than 3 meters and are having a narrow trim removed (25–75 millimeters) are advantageously supported from the bottom at the score, as by the use of board or plank. When this step is omitted (in long pieces and such narrow trim is attempted) a cut exhibiting undercut defects tends to result. With wider trims this step may be omitted.

The operation of the step described in block 26, snapping the bottom skin, may conveniently be done by causing, after the operators have put the plank under the location of the score, the application of a small bending moment to the outboard edges of the nearly severed piece, e.g., by the action of a third man, applying the necessary force by means of suitable tongs or the like, while first and second men hold the plank under the line of cut. Sometimes heat will propagate the fracture to such an extent that the trim will be free of the piece of glass and step 26 is not necessary. This occurs about 20% of the time with large trims (either long or wide or both). This probably happens because large trims have higher weights than small trims and the higher weight creates a moment that is more likely to snap the glass.

At this point, there may be conducted an inspection to determine the quality of the cut that has been opened. In the inspection along the cut edge, looking horizontally, it is customary to see a pattern such as that indicated in FIG. 4. The top surface of the glass is there designated with the numeral 48, and a short distance therebeneath there is seen a marking 50 that has the appearance of a series of fine serrations (producing only a slight roughness) and is indicative of the extent of the deep-fissure score caused by the penetration of the cutting wheel into the glass. As has been stated hereinafter, the marking 50 is in the case of glass 18 to 19 millimeters thick at least 1.75 millimeters from the top surface of the glass. Normally, the region between surface 48 and marking 50 includes about 6 to 30% of the thickness of the glass. Below the marking 50 there is a region 52 that is a smooth planar fracture and, in the case of glass 18 to 19 millimeters thick, extends perpendicularly from glass surface for something like 15 to 17 millimeters of the thickness of the glass down its severed edge. Region 52 extends through the glass for about 60 to 90% of its thickness in a direction perpendicular to the glass surfaces 48 and 56. Below that is a region 54 that is relatively unmarked and extends to the bottom surface 56 of the glass. Between region 52 and 54 there is a faint line 58 that runs parallel to the bottom surface 56 and is spaced at about 0.5 to 2 millimeters therefrom, this line 58 indicating the extent to which the fracture in the glass penetrate when it is thermally opened as taught hereinabove. The distance between line 58 and surface 56 corresponds to about 3 to 10% of the thickness of the glass. Of course, the dimensions indicated above will vary somewhat with glass pieces of different thickness, but the general arrangement and relationship remains the same.

The inspection further comprises viewing the glass vertically, i.e., in a direction perpendicular to the major surfaces of the sheet of glass, to detect "wing" or undercut defects. A satisfactory cut exhibits no such defects or at the worst, ones so minor as to be removed during the subsequent seaming operation.

Figure 4:
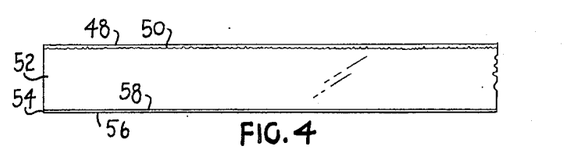
FIG. 4 is an elevation view (drawn to scale except for the bottom edge of the fissure which is diagrammatic) of an edge of a piece of glass cut in accordance with the instant invention.

As used in this application, the terms "deep fissure," "score," or "deep-fissure score" refer to the area between surface 48 and marking 50. The term "fracture" can refer to the area between marking 50 and line 58, and, in the relatively few instances where heat propagates the fracture through to the bottom surface of the glass, it can refer to the area between marking 50 and bottom surface 56 (there is no line 58 under this circumstance). When used broadly, "fracture" includes both of these situations.

As a final step, indicated in block 28, there is conducted a light seaming of only the upper and bottom portions of the ends and edges of the piece of glass so cut. This leaves a smooth edge with no evidence of marking 50 or line 58 remaining. There may be used, for example, a hand-held belt sander using a belt 75 millimeters by 600 millimeters. This is a conventional operation, and it does not require further elaboration or explanation.

The result is that there is produced a finished piece of glass that compares favorably in its edge strength to similar pieces produced by the prior-art method of rough cutting, mechanical snapping, grinding to size, and then polishing. The pieces of the present invention have edge strength of about 4.4 to 4.6 kilograms per square centimeter in the conventional beam-loading test, in comparison with strengths such as 4.6 to 4.9 kilograms per square centimeter for the prior-art ground-and-polished pieces. Either will meet specifications on customary glazing installations. In achieving the edge-strength values indicated above, the final limited seaming operation is important. Without the final seaming operation, the edge strength is on the order of 3.3 to 3.6 kilograms per square centimeter.

Figure 6:
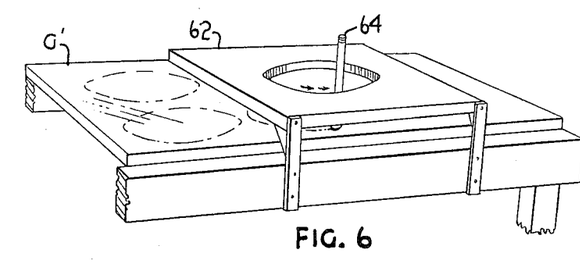
FIG. 6 is a perspective view of a typical set-up for cutting circles in accordance with a second embodiment of the invention.
Figure 7:
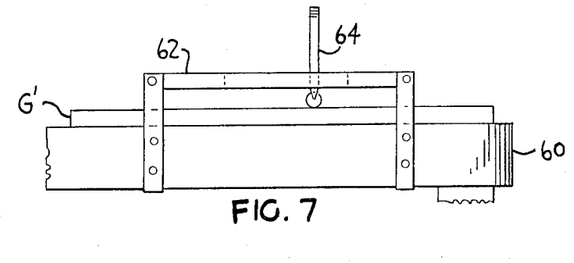
FIG. 7 is an elevation view of the set-up in FIG. 6.
Figure 8:
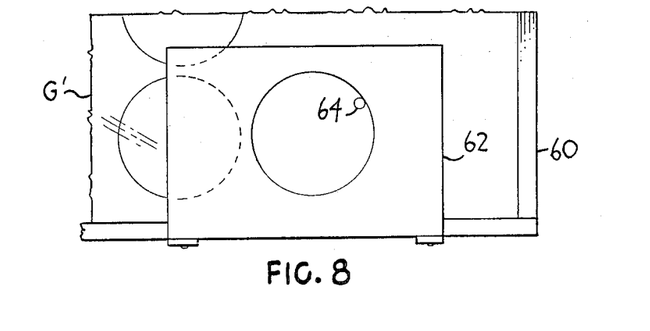
FIG. 8 is a top view of the set-up in FIG. 6.

The invention described above can also be used to produce suitably finished edges on glass 12 millimeters to 36 millimeters thick with the edges concerned being curved rather than straight. FIGS. 6, 7 and 8 show a typical setup for deep scoring the circumference of a circle on flat glass G' in accordance with this embodiment. The glass is placed on a cutting table 60 with a suitable template 62 mounted on the cutting table. Air pressure (not shown) is used to supply a force to the cutting tool 64.

In the case of circles or ovals, it is not possible to get a smooth edge by supporting the score and snapping the bottom skin, as described above. Therefore, an alternate process is used to free the circle or ovals from the trim after they have been scored and the heat applied to propagate the fracture. Referring to blocks 24' and 24" of FIG. 1, edge nicks are applied to the flat glass and then heat is applied by dwelling a heat source at each of the nicks until a vent is completed from the nick to the fracture of the circle. This is done in cutting circles or ovals rather than the step of snapping bottom skins as in block 24.

Block 26' of FIG. 1 refers to the result of applying spot heat to the edge nicks around the piece of glass. After heat is applied to each of these edge nicks, the circle will become completely free of the trim. This is referred to as "breakout" because of the way that this result takes place. As the operator goes from one nick to another creating a plurality of vents, he is freeing the trim from the finished circle. This trim or scrap around the circle breaks free of the circle in a rather dramatic fashion which is referred to as "breakout."

Figure 5:
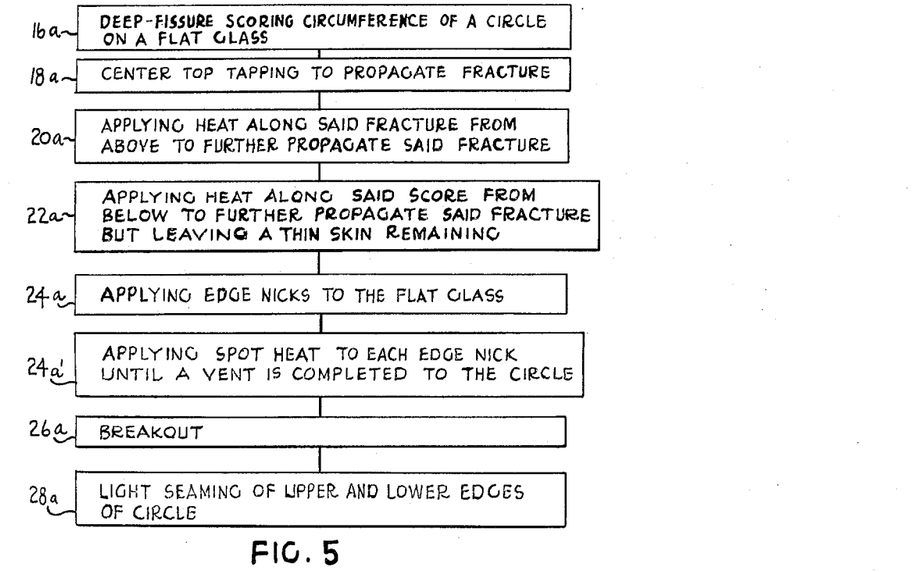
FIG. 5 is a flow diagram of a process in accordance with another embodiment of the invention showing all steps thereof including both essential and optional steps.

FIG. 5 is a flow chart illustrating the steps of a further embodiment of the invention suitable for cutting curved edges. For the most part, this embodiment is very similar to the embodiments disclosed above.

The deep-fissure scoring of block 16a of FIG. 5 is identical to the deep-fissure scoring of block 16 of FIG. 1. FIGS. 6, 7 and 8 show a typical setup for deep scoring the circumference of a circle on flat glass G' in accordance with this embodiment.

Referring to block 18a of FIG. 5, this step is similar to the step of block 18 of FIG. 1. In block 18 of FIG. 1, a mechanical tap from beneath one end of the deep-fissure score is used to begin propagation of a fracture. According to the present embodiment, it has been discovered that by applying the tap from above at the center of curvature of a curved deep-fissure score, a fracture not only propagates to a greater depth as, in the tap beneath the score (block 18), but further, a tap at the center of curvature of the curved deep fissure propagates the fracture around the entire circumference of the curved deep fissure. It is important to point out that the mechanical tapping step of block 18 is not a critical part of the first described embodiment. It merely reduces a dwell time with the heat torch. However, the top center tapping of block 18a of the instant embodiment is an essential part of this embodiment, since it eliminates the necessity of top heating the score (block 20') and it is faster to apply a firm tap to the center of a curved deep fissure than to heat around the entire circumference. In other words, if the top center tap is omitted, one can use heat to propagate a fracture as in the first embodiment, but this is slower than top center tapping.

Figure 10:
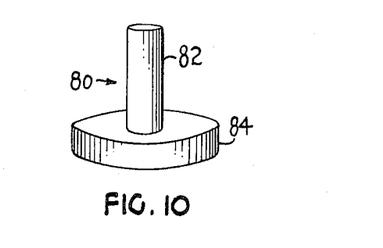
FIG. 10 is a perspective view of a tool used to top center tap.

Referring to FIG. 10, there is shown a tool 80 that is used in the center tap step. The tool is placed at the center of curvature of the curve with portion 84 resting directly on the glass. The operator strikes portion 82 from above with a hammer or mallet.

Referring to block 20a of FIG. 5, the next step is to apply heat along the deep fissure from above to further propagate the fracture. This is similar to the step recited in block 20 of FIG. 1. As pointed out above, step 20a is not essential since the top center tap propagates the fracture to a great extent. However, when step 20a is incorporated into the process, an even higher quality edge is produced that requires less seaming.

Referring to block 22a of FIG. 5, heat is applied along said fracture from below to further propagate the fracture and leave a thinner skin. This heating from below is similar to the heating of block 22 in that it conditions the glass for breakout by further propagating the fracture. As above, this step is not an essential part of the invention, but it has been included for the sake of completeness.

Referring to blocks 24a and 24a' of FIG. 5, edge nicks are applied to the flat glass and then heat is applied by dwelling a heat source at each of the nicks until a vent is completed from the nick to the fracture of the circle. This is identical to the steps of blocks 24' and 24" of FIG. 1.

Block 26a of FIG. 5 refers to the result of applying spot heat to the edge nicks around the piece of glass. After heat is applied to each of these edge nicks, the circle will become completely free of the trim. This is referred to a "breakout" because of the way that this result takes place. As the operator goes from one nick to another creating a plurality of vents, he is freeing the trim from the finished circle. This trim or scrap around the circle breaks free of the circle in a rather dramatic fashion which is referred to as "breakout." The "breakout" described with respect to block 26a is identical to the "breakout" of block 26' of FIG. 1.

Figure 9:
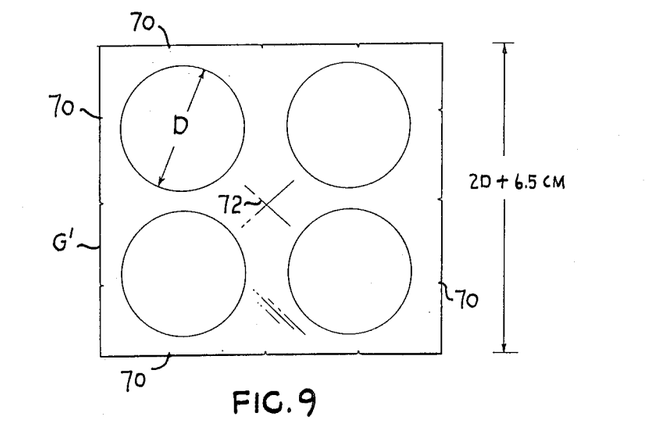
FIG. 9 is a top view of a glass surface (drawn to scale) after it has been nicked.

Referring to FIG. 9, there is shown a view of the top glass surface after the edge nicks have been made. The layout of glass circles on the glass sheet forms no part of the present invention, but has been included merely as an example. It has been discovered that it is convenient to take four circles from a square piece of glass as illustrated in FIG. 9. The dimensions of the glass are such that each side is twice the diameter of the circles to be cut plus about 6.5 centimeters. Edge nicks are indicated at 70 in FIG. 9. Further, a cross 72 is scored into the top surface of the glass between the four circles. Edge nicks 70 and cross 72 are then heated to cause the circles to "breakout." Heating cross 72 before edge nicks 70 yields a better curved edge on the circles.

As a final step, indicated in block 28a, there is conducted a light seaming of the upper and bottom portions of the circumference of the piece of glass so cut. This is identical to the procedure of block 28 in FIG. 1.

While the last-mentioned embodiment (FIG. 5) has proved to be excellent for the cutting of curved edges, attempts to practice it on straight lines have been futile. In the cutting of straight edges, mechanical tapping from below one end of a score will propagate said score to a greater depth, but it will not make the score propagate to a deep fracture along the length of the score. There does not appear to be any area on a piece of flat glass, where a tap (top or bottom) will propagate a fracture, along the length of a straight deep fissure the way a top center tap will propagate a fracture around the circumference of a circle.

MODIFICATIONS, EQUIVALENTS AND OTHER EMBODIMENTS OF THE INVENTION

The glass cut does not need to be 18 to 19 millimeters thick. Glass considerably thinner, down to 3 millimeters thick, or conceivably as thick as 60 or 90 millimeters, may similarly be cut and finished in accordance with the present invention. Of course, changes in the thickness of the glass dictate the necessary of other changes in the process. In general, the greater the thickness of the glass, the greater should be the diameter of the scoring wheel and the scoring force used to effect the deep fissure in the glass, and the deeper that fissure needs to be. For example, in cutting 3-millimeter glass, it is satisfactory to produce a fissure depth of 0.75 millimeter or more. With 6-millimeter glass, the fissure should be 1 millimeter or more in depth. With 13-millimeter glass, the fissure should have a depth of 1.5 millimeters or more. It can be said that the fissure should be 6 to 30% of the thickness of the glass, lower values generally being used with greater thicknesses and higher values generally being used with thinner thicknesses. It is preferred in producing a cut edge on relatively thick glass, for example, in excess of approximately 10 millimeters, to form a fissure of 1.5 millimeters or more, as indicated above, which fissure is about 6% or more of the thickness of the glass.

As the glass becomes thicker, it becomes increasingly difficult to produce with a scoring wheel of a given diameter a fissure of the required depth without causing undesirable surface defects. This means that with thicker glass, a larger scoring wheel should be used, and with thinner glass, the use of a somewhat smaller scoring wheel is permissible. The results, when an attempt was made to cut 18.5-millimeter glass with a wheel about 9 millimeters in diameter, were marginal. Similarly, the results were marginal when an attempt was made to cut 13-millimeter glass with the use of a wheel about 5 millimeters in diameter.

Those skilled in the art will appreciate that there are various ways in which the scoring wheel 4 may be brought into contact with a surface of a piece of glass that is to be finished in accordance with the invention while still obtaining satisfactory results. It will suffice, for the present, to state that the scoring wheel that may have passed through its central opening 14 an axle that is journaled in a cage that is supported for vertical movement, under suitable spring loading, in a channel that is contained in one leg of a C-shaped housing, the opposite leg of which comprises means containing a roller for bearing upon the glass in opposition to the scoring wheel 4.

It is also anticipated that the invention can be modified to cut round holes in sheets of glass. In such a case, edge nicks would be placed within the circle. After the nicks are heated to create vents, the circle is cooled while the remainder of the sheet is heated to release the circle and leave a hole in the sheet with a good edge.

Bent or other form of flat glass may be cut as herein contemplated. It is also possible to cut shapes other than circles and ovals. For example, polygons having curved corners. Further, the invention may also be practiced in cutting glass objects such as thick cylinders, rods and tubes.

While the invention has thus far been described with respect to glass, it should be understood that it is not limited to such. For example, the techniques described herein may be used to cut other refractories, including ceramics such as Monofrax, a dense ceramic sold by the Carborundum Corporation.

The invention is also very useful in problem cutting areas. For example, it is extremely difficult to remove a bulb edge or a knurled edge even on thin glass, such as 1.5 millimeters thick. It has been customary to remove the bulb edge with a first cut and then make a second cut to obtain a good cut edge. This is referred to as a "double cut." One can readily see that double cutting wastes glass and man hours.

Using the deep-scoring techniques of the present invention, it is possible to remove a bulb edge from 1.5 millimeter glass by taking a 6 millimeter trim. With thin glass, such as below or about 6 millimeters thick, it is possible to remove a bulb edge by deep scoring followed by a bending moment. With glass thicker than about 6 millimeters, heat is generally necessary to propagate a fracture, before the bending moment is applied, in order to obtain a good edge with a single cut.

Having now fully disclosed the invention, what I claim is as follows:

1. A method of producing a cut edge on glass above about 10 millimeters thick comprising the steps of:
    scoring the surface of the glass with a force and at a scoring rate sufficient to produce a fissure of a depth of at least about 1.5 millimeters without fracturing said glass, said force being exerted by a rotary cutting element having a diameter of at least about 12 millimeters and a cutting edge having a cutting angle of at least about 150 degrees, and
    projecting said fissure through the thickness of said glass by at least one separate step, nonsimultaneously, after said fissure is produced.

2. A method of producing a cut edge as defined in claim 1, wherein said fissure is projected by:
    applying a bending moment about said fissure.

3. A method of producing a cut edge on glass above about 10 millimeters thick comprising the steps of:
    scoring the surface of the glass with a force and at a scoring rate sufficient to produce a fissure of a depth of at least about 1.5 millimeters without fracturing said glass, said force being exerted by a rotary cutting element having a diameter of at least about 12 millimeters and a cutting edge having a cutting angle of at least about 150 degrees,
    propagating said fissure deeper into the thickness of said glass by at least one separate step, nonsimultaneously, after said fissure is produced and leaving a thin layer of glass, and
    severing said thin layer of glass to complete the cut edge.

4. A method of producing a curved cut edge on a relatively thick sheet of flat glass comprising the steps of:
    scoring a surface of said sheet along a curved path to form a score,
    propagating said fissure by applying a tap at a center of curvture of said curved path on said surface to propagate said fissure deeper through the thickness of said sheet and around the entire curved path, and
    breaking out a piece with a curved edge from the trim.

5. A method of producing a curved cut edge as defined in claim 4, wherein said fissure is scored by a scoring wheel having a diameter of about 12.7 millimeters and a cutting angle between 150 degrees to 165 degrees.

6. A method of producing a curved cut edge as defined in claim 5, wherein said cutting angle is 160 degrees.

7. A method of producing a curved cut edge as defined in claim 4, wherein the depth of said fissure is between 6 to 30 percent of the thickness of said sheet.

8. A method of producing a curved cut edge as defined in claim 4, wherein propagating said fissure includes the step of applying heat along said score from above after said tap to further propagate a fracture.

9. A method of producing a curved cut edge as defined in claim 8, wherein propagating said fissure includes the step of applying heat along said fracture from below to further propagate said fracture.

10. A method of producing a curved cut edge as defined in claim 4, wherein breaking out of said piece with a curved edge is accomplished by applying edge nicks to said sheet and applying spot heat to each edge nick until a vent is completed to the curved edge.

11. A method of producing a curved cut edge as defined in claim 4, wherein said curved edge is lightly seamed.

12. A method of producing a curved cut edge as defined in claim 4, wherein the surface of said sheet is scored along a curved path to form a deep score having a depth of at least about 1.5 millimeters.

13. A method of producing a curved cut edge on a relatively thick sheet of flat glass comprising the steps of:
deep scoring a surface of said sheet along a curved path using a scoring wheel having a diameter of about 12.7 millimeters and a cutting angle of about 160 degrees to form a deep-fissure score having a depth of at least about 1.5 millimeters,
applying a tap at a center of curvature of said curved path on said surface to propagate said fissure deeper through the thickness of said sheet and around the entire curved path,
applying heat along said score from above to further propagate a fracture,
applying heat along said fracture from below to further propagate said fracture while leaving a thin skin remaining,
applying edge nicks to said sheet,
spot heating each of said edge nicks until a vent is completed to the curved edge,
breaking out a piece of glass with a curved edge from the trim, and
light seaming the upper and lower portions of said curved edge.

14. A relatively thick glass article having opposing surfaces and a cut edge extending therebetween in a direction substantially perpendicular to said opposing surfaces, said cut edge having a fracture area and a fissure area, said glass article being prepared by the method of claim 1.

15. A relatively thick glass article having opposing surfaces and a cut edge extending therebetween in a direction substantially perpendicular to said opposing surfaces, said cut edge having a smooth strong fracture area, a fissure area adjacent one surface of the article and a severed thin zone adjacent the opposing surface of the article, said glass article being prepared by the process of claim 3.

16. A method of producing a cut edge on glass above about 10 millimeters thick comprising the steps of:
scoring the surface of the glass with a force and at a scoring rate sufficient to produce a fissure depth of at least about 1.5 millimeters without fracturing said glass, said force being exerted by a rotary cutting element having a diameter of at least about 12 millimeters and a cutting edge having a cutting angle of at least about 150 degrees, and
heating said score from above from a first end to a second end thereof to propagate said score into a fracture.

17. A method of producing a cut edge on a sheet of flat glass as described in claim 16, wherein the propagating of said fracture includes the step of mechanically tapping one of said first end and said second end of said score from below to begin propagation before heating said score.

18. A method of producing a cut edge on a sheet of flat glass as described in claim 16, wherein heat is applied from below said fracture along its entire length after heating said score.

19. A method of producing a cut edge on a sheet of flat glass as described in claim 17, wherein heat is applied from below said fracture along its entire length after heating said score.

20. A method of producing a cut edge on a sheet of flat glass above about 10 millimeters thick comprising the steps of:
deep scoring said sheet along a path with a force and at a scoring rate sufficient to produce a deep-fissure score of a depth of at least about 1.5 millimeters from a first end to a second end of said sheet without fracturing said glass, said force being exerted by a rotary cutting element having a diameter of at least about 12 millimeters and a cutting edge having a cutting angle of at least about 150 degrees,
directing a heat source from above at the first end of said deep-fissure score,
moving said heat source gradually from the first end to the second end of said deep-fissure score to propagate a fracture while leaving a thin zone beneath the fracture, and
applying a force to sever said thin zone.

21. A method of producing a cut edge on a sheet of flat glass as described in claim 20, wherein said force is applied by snapping said thin zone.

22. A method of producing a cut edge on a sheet of flat glass as described in claim 20, wherein said force comprises:
applying edge nicks to the sheet,
applying spot heat to each edge nick until a vent is completed to said fracture, and
breaking out a piece from the sheet.

23. A method of producing a cut edge on a sheet of flat glass above about 10 millimeters thick comprising the steps of:
deep-fissure scoring a surface of said sheet from a first end to a second end thereof with a force and at a scoring rate sufficient to produce a fissure to a depth of at least about 1.5 millimeters, said force being exerted by a rotary cutting element having a diameter of at least about 12 millimeters and a cutting edge having a cutting angle of at least about 150 degrees,
mechanically tapping one of said first end and said second end of said score from below to start the propagation of a fracture from said score,
directing a heat source from above directly on said one end of said deep-fissure score,
moving said heat source gradually from said one end to the other end of said deep-fissure score to cause the sheet to become nearly severed by further propagating said fracture,
directing a heat source from below said fracture along its entire length to further propagate said fracture,
snapping a thin zone that remains beneath said fracture to release a piece of glass from said sheet, and
light seaming upper and lower portions of an edge of said piece so produced.

24. A method of producing a cut edge on a sheet of flat glass above about 10 millimeters thick comprising the steps of:
deep-fissure scoring a surface of said sheet from a first end to a second end thereof with a force and at a scoring rate sufficient to produce a fissure to a depth of at least about 1.5 millimeters, said force being exerted by a rotary cutting element having a diameter of at least about 12 millimeters and a cutting edge having a cutting angle of at least about 150 degrees, mechanically tapping one of said first end and said second end of said score from below to start the propagation of a fracture from said score.

directing a heat source from above directly on said one end of said deep-fissure score, moving said heat source gradually from said one end to the other end of said deep-fissure score to cause the sheet to become nearly severed by further propagating said fracture, directing a heat source from below said fracture along its entire length to further propagate said facture, applying edge nicks to said sheet, applying spot heat to each edge nick until a vent is completed to said fracture, breaking out a piece of glass from said sheet, and light seaming upper and lower portions of an edge of said piece so produced.

25. A method of producing a cut edge on a refractory material above about 10 millimeters thick comprising the steps of:

scoring the surface of the refractory material with a force and at a scoring rate sufficient to produce a fissure of at least about 1.5 millimeters without fracturing said glass, said force being exerted by a rotary cutting element having a diameter of at least about 12 millimeters and a cutting edge having a cutting angle of at least about 150 degrees, and projecting said fissure through the thickness of said refractory material by at least one separate step, nonsimultaneously after said fissure is produced.

26. A method of producing a cut edge on a refractory material above about 10 millimeters thick comprising the steps of:

scoring the surface of the refractory material with a force and at a scoring rate sufficient to produce a fissure of a depth of at least about 1.5 millimeters without fracturing said glass, said force being exerted by a rotary cutting element having a diameter of at least about 12 millimeters and a cutting edge having a cutting angle of at least about 150 degrees, propagating said fissure deeper into the thickness of said refractory material by at least one separate step, nonsimultaneously, after said fissure is produced and leaving a thin layer of refractory material, and severing said thin layer of refractory material to complete the cut edge.

27. A method of producing a cut edge as defined in claim 1, wherein said fissure is produced by a scoring wheel having a cutting angle between 150 degrees to 165 degrees.

28. A method of producing a cut edge as defined in claim 1, wherein said fissure is produced by a scoring wheel having a cutting angle between 157 degrees to 162 degrees.

29. A method of producing a cut edge as defined in claim 1, wherein said fissure is produced by a scoring wheel having a cutting angle of about 160 degrees.

30. A method of producing a cut edge as defined in claim 3, wherein said fissure is produced by a scoring wheel having a cutting angle between 150 degrees to 165 degrees.

31. A method of producing a cut edge as defined in claim 3, wherein said fissure is produced by a scoring wheel having a cutting angle between 157 degrees to 162 degrees.

32. A method of producing a cut edge as defined in claim 3, wherein said fissure is produced by a scoring wheel having a cutting angle of about 160 degrees.

References Cited
UNITED STATES PATENTS

| | | | |
|---|---|---|---|
| 3,474,944 | 10/1969 | Chatelain et al. | 225—2 |
| 3,169,683 | 2/1965 | Pierce | 225—2 |
| 3,453,097 | 7/1969 | Häfner | 65—112 |

ARTHUR D. KELLOGG, Primary Examiner

U.S. Cl. X.R.

65—112, 113, 174; 225—2, 93.5